Jan. 16, 1951   J. M. ANDERSON ET AL   2,538,226
COMPUTING MEANS
Filed Dec. 22, 1944   2 Sheets-Sheet 1
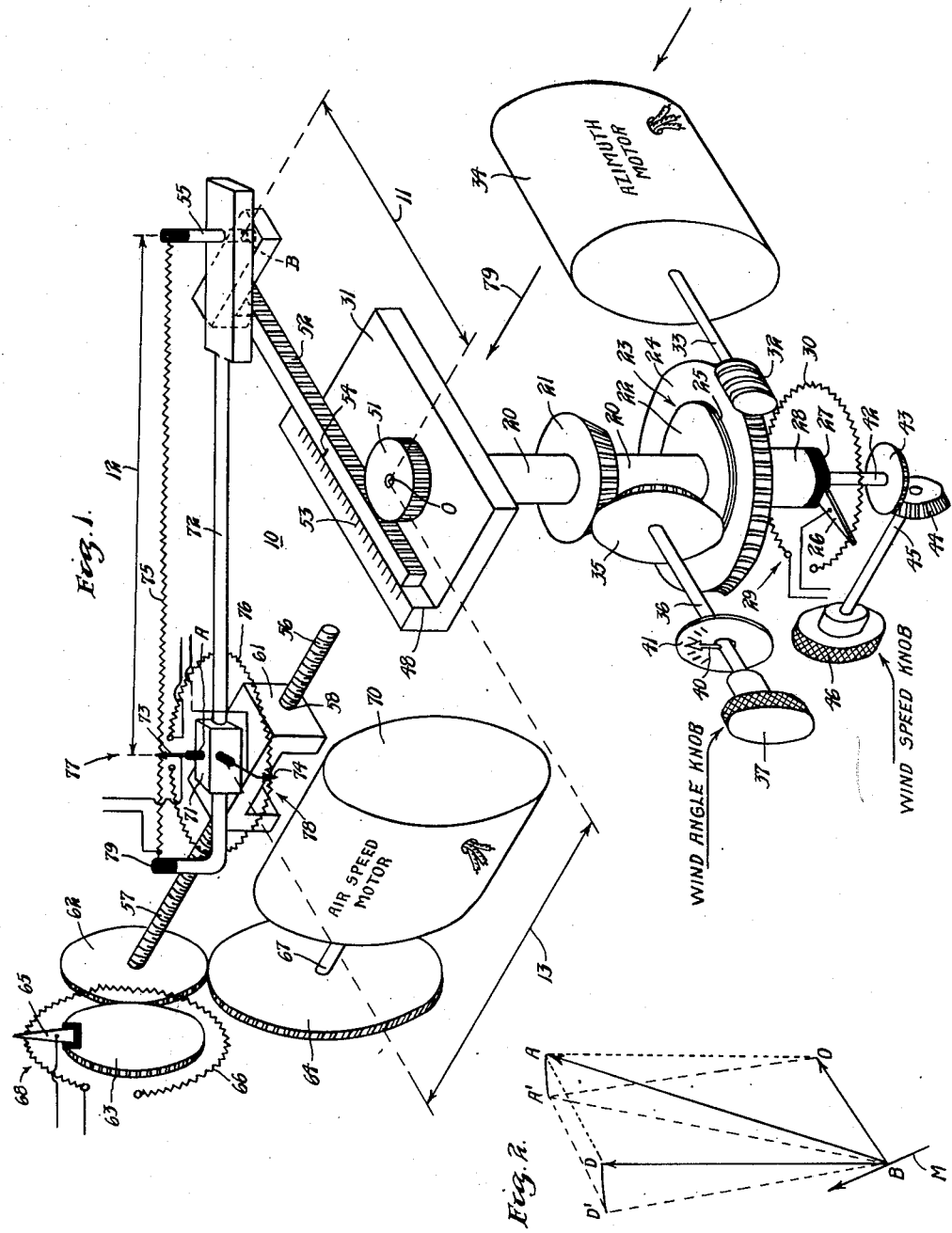
INVENTORS
JOHN M. ANDERSON
FRANK M. EXNER
RAYMOND E. HASELBERGER
BY George H. Fisher
ATTORNEY Jan. 16, 1951  J. M. ANDERSON ET AL  2,538,226
COMPUTING MEANS
Filed Dec. 22, 1944  2 Sheets-Sheet 2
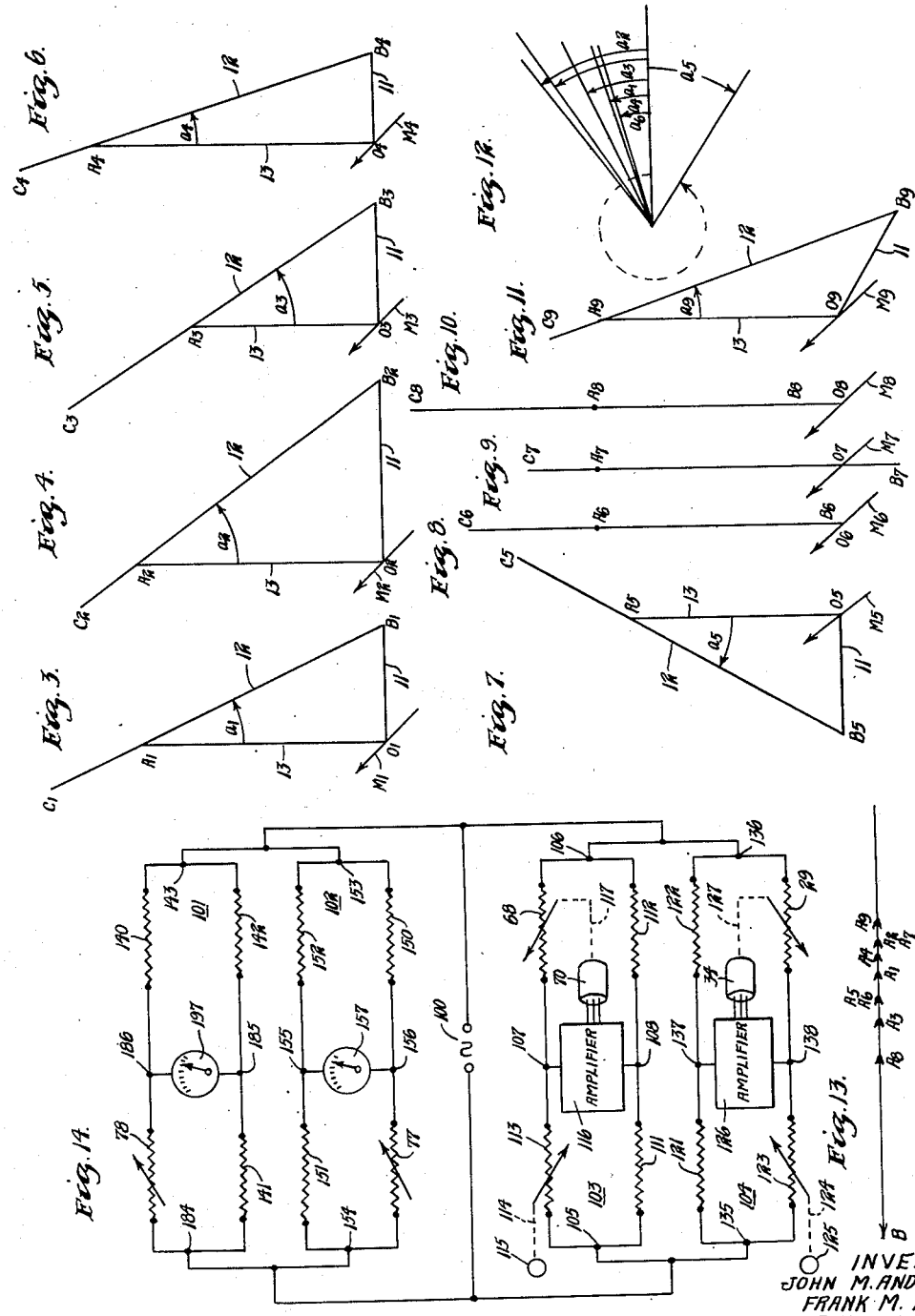
INVENTORS
JOHN M. ANDERSON
FRANK M. EXNER
RAYMOND E. HASELBERGER
BY George H. Fisher
ATTORNEY

Patented Jan. 16, 1951

2,538,226

UNITED STATES PATENT OFFICE 2,538,226

COMPUTING MEANS

John M. Anderson and Frank M. Exner, Minneapolis, and Raymond E. Haselberger, St. Paul, Minn., assignors to Minneapolis-Honeywell Regulator Company, Minneapolis, Minn., a corporation of Delaware Application December 22, 1944, Serial No. 569,376

13 Claims. (Cl. 235—61)

Our invention relates to the field of aeronautical engineering, and more specifically to the portion of that field dealing with instruments for indicating the drift angle and ground speed of a craft in the air. The invention comprises a novel variable resistor and a novel mechanical linkage. In its broader aspects, however, our invention is not limited to use in this connection, but is of broad applicability whenever it is desired to solve vector triangles. It is accordingly an object of our invention to provide a new and improved computing device.

It is an object of our invention to provide a new and improved vector computer.

It is an object of our invention to provide new and improved means for solving triangles mechanically.

It is another object of our invention to provide a new and improved ground speed indicator.

It is another object of our invention to provide a new and improved drift angle indicator.

It is a further object of our invention to provide a new and improved instrument for indicating ground speed and drift angle.

It is a further object of our invention to provide an instrument such as described above which is automatically corrected for changes in the air speed of the aircraft.

It is a further object of our invention to provide an instrument as described above which is automatically corrected for change in the heading of the plane.

It is a still further object of our invention to provide an instrument as described above which is automatically corrected for both change in the air speed and change in the heading of the craft.

It is another object of our invention to provide a new and useful mechanical linkage.

It is yet another object of our invention to provide a novel and useful means for varying a resistance in accordance with three independently varying factors.

It is still another object of our invention to provide a novel and useful means for varying the resistance of a plurality of resistors in accordance with changes in three independently varying factors.

Various other objects, advantages, and features of novelty which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention.

In the drawing,

Figure 1 is a generally schematic showing of a physical embodiment of our invention, Figures 2 to 11, inclusive, are vector diagrams illustrative of the use of our invention, Figures 12 and 13 are diagrams presented to assist in the understanding of the operation of our invention, and Figure 14 is a wiring diagram of electrical circuits involved in the practice of our invention.

Referring now to Figure 1, it will be seen that our invention comprises a triangular linkage 10, the lengths of whose sides are indicated by the lines 11, 12 and 13. The lengths of these lines and the angles by which they are related are determined by knobs and motor drives which influence the linkage through various mechanical trains about to be described.

It will be seen that the invention comprises a shaft 20 mounted in suitable bearings, not shown. A bevel gear 21 is mounted on shaft 20 for unitary rotation therewith, as is the upper disk 22 of a slip friction mechanism 23. A worm wheel 24 is mounted for free rotation on shaft 20, and is connected thereto by frictional engagement with disk 22 through friction disk 25 of mechanism 23. A worm 32 is carried by the shaft 33 of a suitably mounted motor 34, and engages worm wheel 24 in driving relation. An electrical contact arm 26 is mounted on a hub 28 of worm wheel 24, for unitary rotation therewith, by an insulating boss 27. A circular resistance member 30 is mounted by any convenient means, not shown, for cooperation with member 26 as it rotates with worm wheel 24 to comprise a variable resistor 29. At its upper end shaft 20 carries a rack guide member 31.

A bevel gear 35 is carried by a shaft 36 mounted in suitable bearings, not shown, and engages bevel gear 21 carried by shaft 20. Shaft 36 is rotatable by a manual knob 37 and carries a pointer 40 which cooperates with a suitably supported fixed scale 41 to indicate the amount of rotation of shaft 36. By this arrangement it will be apparent that rotation of knob 37 acts to cause rotation of rack guide 31 around the axis of shaft 20, and that energization of motor 34 acts in a similar fashion. Since reverse drive from worm wheel 24 through worm 32 to motor 34 is impossible because of the mechanical nature of the drive, the interposition of slip friction member 23 is necessary in order to permit drive of shaft 20 in either direction by knob 37: when the knob is turned, rotation of shaft 20 takes place, worm wheel 24 slipping with respect to upper disk 22.

Shaft 20 is hollow and is traversed by a second shaft 42, for which it forms a bearing. At its lower end shaft 42 carries a bevel gear 43 which meshes with a second bevel gear 44 carried by a second shaft 45. Shaft 45 is mounted in suitable bearings, not shown, and carries at its outer end a manual knob 46.

At its upper end, shaft 42 protrudes beyond guide 31 and carries a gear 51 which meshes with a rack 52 carrying a pivot 55 at one end. Rack 52 is restrained between gear 51 and a shoulder portion 48 of guide 31, and rotation of gear 51 with respect to guide 31 causes linear displacement of rack 52 along the guide. The shoulder portion 48 of guide 31 may carry a plurality of indicia 53, and rack 52 may be provided with an index 54 to indicate the displaced position of rack 52.

Shaft 42 is closely fitted within shaft 20, so that when shaft 20 is rotated by knob 37 or motor 34, shaft 42 is carried with it, rotating knob 46. By this means manual or motor rotation of shaft 20 is prevented from changing the position of index 54 with respect to scale 53.

The effect of rotating knob 46 is to change the linear displacement between the axes of shaft 20 and pivot 55, and this distance comprises link 11. The end of the rack is offset so that for a zero indication of index 54 with respect to graduation 53 the axes of shaft 20 and pivot member 55 are colinear, and rotation of guide 31 about the axis of shaft 20 by knob 37 produces no change in the position of pivot member 55.

A second shaft 56 is mounted by any suitable means (not shown) for free rotative movement without axial movement. Shaft 56 carries an external thread 57, cooperating with an internal thread 58 in a pivot member 61, which accordingly is translated axially along the shaft as the latter rotates. On one end shaft 56 carries a gear 62 which engages a plurality of gears 63 and 64. Mounted on and insulated from gear 63 is a contact member 65, and a circular resistor 66 is fixedly mounted in any suitable fashion (not shown) for sliding engagement by contact member 65, as the latter rotates, to comprise a variable resistor 68.

It will be appreciated that under some conditions rotation of shaft 56 through a number of revolutions may be required. In such cases a gear reduction may be provided between shaft 56 and variable resistor 68, or a helical variable resistor may be used.

Gear 64 is carried on the shaft 67 of a second suitably mounted motor 70 so that energization of motor 70 is effective to cause movement of pivot member 61 axially of shaft 56. It will be appreciated that motor 70 may be replaced by a manually operated knob at the desire of the user, and this is also true of motor 34.

A linear guide 71 is pivotally mounted upon pivot member 61 and is bored to slidingly receive a rod 72. Guide 71 also carries a pair of contact members 73 and 74, which are insulated therefrom and which cooperate with a pair of resistance members 75 and 76, respectively, to comprise a pair of variable resistors 77 and 78. Resistance member 76 is supported by and insulated from pivot member 61 for cooperation with contact member 74. Resistance member 75 is supported by and insulated from rod 72 and pivot member 55 at its respective ends, and cooperates with contact member 73. It will now be apparent that rotation of shaft 56 from whatever cause is effective to vary the displacement between the pivot of pivot member 61 and the center of shaft 20, and this displacement comprises link 13.

Link 12 comprises the distance between the pivot of pivot member 61 and pivot member 55. This distance varies independently with movement of pivot member 61 along shaft 56, with displacement of pivot member 55 from the center of shaft 20, and with rotation of rack guide 31 about the axis of shaft 20. For each set of values of these variables, there is a single unique condition of rod 72 which is indicated by the length of link 12 and the angle between links 12 and 13, as illustrated in Figures 3 to 13, inclusive.

The operation of our invention is based on considerations illustrated in Figure 2.

When a body located at B is subject to two forces acting in generally different directions, the resulting effect on the body can be represented by a single force acting in a single direction. Thus, if $\overline{BD}$ is the vector representing the first of a pair of forces and $\overline{BO}$ is the vector representing the second force, there is a third vector $\overline{BA}$ which is representative of a single force having the same effect on the body as the two forces acting jointly. As is well known, vector $\overline{BA}$ is obtained by setting the tail of one of the vectors at B, and placing the tail of the second vector on the head of the first, moving each vector always parallel to itself without changing its length. A vector drawn from the starting point to the head of the last vector is the "vector sum" of the vectors; that is, the single equivalent vector having the desired direction and magnitude. Thus, if the vector $\overline{BO}$ is laid out from point B and the vector $\overline{BD}$ is moved so that its tail is on point O, it will take the position $\overline{OA}$. $\overline{BA}$ is therefore the sum of vectors $\overline{BO}$ and $\overline{BD}$.

Suppose that the force $\overline{BD}$ changes its direction with respect to an arbitrary reference direction M, and takes a new direction $\overline{BD}'$, vector $\overline{BO}$ remaining unchanged. The vector triangle is now BOA' instead of BOA and both the length of $\overline{BA}'$ and the magnitude of angle BA'O differ from $\overline{BA}$ and BAO. This is clearly not the same as rotating the whole triangle BAO about its vertex O until $\overline{OA}$ takes a new direction $\overline{OA}'$, since the latter movement would displace B from its proper location. Reference will later be made to this distinction.

If the vector $\overline{OB}$ ($=-\overline{BO}$) is substituted for vector $\overline{BO}$, it is possible to start from O and lay off the two vectors, joining their heads by vector $\overline{BA}$ as before. This method is of convenience, since it makes possible the determination of a point, O, which may be fixed in space and from which both vectors may be laid off: this method is used in the practice of our invention, and the vectors accordingly represent velocities.

Suppose the true air speed of an aircraft and also the wind velocity are known both in magnitude and direction. As far as the movement of the craft with respect to the earth is concerned, the two velocities represent the effect on the craft of two forces, the engines and the wind: the actual direction and speed of movement of the craft over the ground is the vector sum of these velocities as outlined above. The curvature of the earth may be neglected since the altitude of the craft is negligible in comparison with the earth's radius. Point 55, the center of shafts 42 and 20, and the pivot of member 61 in Figure 1 correspond respectively to points B, O, and A in Figure 2. Motors 34 and 70, resistance windings 30 and 66, the axial directions of shafts 20, 42, and 56, and so forth, form a matrix which is fixed with respect to the craft, and which corresponds to reference M in Figure 2. Links 11, 12, and 13 correspond to vectors ($-\overline{BO}$), $\overline{BA}$ and $\overline{OA}$.

Link 13 ($=\overline{OA}$) is varied in length by motor 70 in accordance with the true air speed of the craft, as discussed below, and is fixed with respect to the matrix so that it bears an unchanging relation to the heading of the craft: the link is therefore a vector representative of the true air speed to an arbitrary scale. In similar fashion, link 11 ($=-\overline{BD}$) is a vector representative of wind velocity to the same scale: it is variable in length by knob 46 and its angle with respect to the matrix is adjustable by knob 37.

On receiving the report as to the direction and speed of the wind at the desired altitude, or after making an estimate of these factors, it is only necessary to adjust knobs 37 and 46 until the required values are indicated by indices 54 and 40. Link 11 then has the length and direction with respect to link 13 necessary for vectorially representing the wind on the same scale. Link 12 is accordingly the vector sum of links 11 and 13: its length is a measure of the ground speed to the same arbitrary scale, and its angle with link 13 gives the drift angle of the craft—that is, the angle between the heading of the craft and its ground path.

From a study of Figure 1 it is apparent that link 13 and shafts 20 and 42 are a part of the matrix which is fixed to the craft, and that the whole triangle is rotated in space when the craft turns. As pointed out above, change in a vector produces a change in the vector sum which is not the same as rotating the whole triangle: therefore, means are provided for changing the angular relation between links 11 and 13 as the matrix turns, so that the links properly represent vectorially the forces involved. Thus, if the craft is heading along a line parallel to shaft 56 as indicated by arrow 79 and turns to the left through 15°, rack guide 31 must be rotated through 15° in a counterclockwise direction to maintain the vectors in the proper angular relation. This function is performed by azimuth motor 34 acting upon guide 31 through worm 32, worm wheel 24, and friction drive 23; knob 37 is automatically rotated as motor 32 operates to indicate the new angular relation between wind and heading of the craft.

Gears 21 and 35 have the same number of teeth, so that one rotation of knob 37 causes one rotation of guide 31 about the axis of shafts 20 and 42. Motor 34 is energized by a compass, as will be discussed below, and if the invention is installed so that index 41 indicates zero when the heading of the craft is north and the wind direction is north, the angle indicated by index 41 for any other wind angle setting is the bearing of the wind, either geographically or magnetically, depending on the type of compass used. Since the bearing of the matrix is fixed with respect to the craft, its directional bearing is always the heading of the craft for all maneuvers.

Before discussing the means energizing motors 34 and 70, and the functions of variable resistors 29, 68, 77, and 78, Figures 3 to 11 should be noted. These figures illustrate typical vector triangles encountered in the use of our invention, and also the way in which the device is applied to these problems. Figure 3 is used as an arbitrary basis, and the remaining figures illustrate various alternative conditions which may be encountered. In these figures, links 11, 12, and 13 are identical, and points O, A, and B are also shown, corresponding with similar points in Figure 2 in their relation to Figure 1. In each figure the drift angle of the craft is indicated by $\alpha$ and the upturned end 79 of member 72 is indicated by C.

In each of the figures link 13 is angularly fixed with respect to datum M, while link 11 is capable of angular displacement with respect thereto. Both link 11 and link 13 are capable of linear adjustment from point O, and link 12, pivoted at point B, is free to slide in bearing 61 at point A so that its length $\overline{AB}$ is the desired vector sum. The unused portion of member 72 extends beyond A in the direction $\overline{AC}$. The expressions "same" and "changed" are based on Figure 3.

In Figure 4 link 11 is extended while link 13 is the same: $A_2B_2$ is greater than $A_1B_1$ and $\alpha_2$ is greater than $\alpha_1$.

In Figure 5 link 13 is reduced and link 11 is the same: $A_3B_3$ is less than $A_1B_1$ but $\alpha_3$ is greater than $\alpha_1$.

In Figure 6 link 11 is reduced and link 13 is extended: $A_4B_4$ is less than $A_1B_1$, and $\alpha_4$ is less than $\alpha_1$.

In Figure 7 link 11 is the same and link 13 is reduced; link 11 is also rotated about O through 180°: $A_5B_5$ is less than $A_1B_1$ and $\alpha_5 = -\alpha_1 = (360° - \alpha_1)$.

In Figure 8 link 13 is the same but link 11 has been reduced to zero: $A_6B_6$ is less than $A_1B_1$ and $\alpha_6 = 0$. This is the condition of no wind.

In Figure 9 link 13 is the same while link 11 has been reduced and rotated so that it lies along link 13 but extends in the opposite direction: $A_7B_7$ is greater than $A_1B_1$ and $\alpha_7 = 0$. This condition is met with in direct headwinds.

In Figure 10 link 13 is the same, but link 11 has been reduced and rotated so that it lies along link 13 and extends in the same direction. $A_8B_8$ is less than $A_1B_1$ and $\alpha_8 = 0$. This is the condition in direct tail winds.

In Figure 11 links 11 and 13 are unchanged, and link 11 is rotated through an arbitrary angle. $A_9B_9$ is greater than $A_1B_1$ and $\alpha_9$ is less than $\alpha_1$.

Figures 3 to 11 have been presented to show that for each particular length of link 13 and length and angle of link 11 there is a singular combination of length and angle of link 12 which corresponds. Figures 12 and 13 compare the angles and the lengths respectively for the illustrated cases to make this point more evident.

In Figure 14 there is schematically shown a system including our invention, indicating methods by which motors 34 and 70 will be energized and also showing means for utilizing variable resistors 77 and 78. Our system is shown to comprise a number of normally balanced electrical bridges 101, 102, 103 and 104 energized from a common source 100, each bridge comprising a plurality of impedance arms which we here show as simple resistance members.

Bridge 103 has input terminals 105 and 106 and output terminals 107 and 108, and comprise fixed resistors 111 and 112 and variable resistors 113 and 68. A mechanical input mechanism 114 controlled by a true air speed meter schematically indicated at 115 is shown as varying the resistance of resistor 113. This unbalances bridge 103, impressing a signal voltage on an amplifier 116 connected to the output of the bridge. Motor 70 is accordingly energized to operate in a forward or reverse direction depending upon the direction of unbalance of the bridge, and a mechanical link 117 between motor 70 and resistor 68 enables operation of the motor to rebalance the bridge. The extent of movement of motor 70 is hence dependent upon the extent of deviation of the air speed as measured by airspeed meter 115.

In Figure 1, link 117 comprises shaft 67, gears 64, 62, and 63, and arm 65: gear 62 also moves member 61 along shaft 56. Operation of this bridge is effective to adjust the length of link 13 along shaft 56 in accordance with the indication of airspeed meter 115. As previously pointed out, it may be desired to set the length of link 13 manually instead of automatically: in such a case bridge 103 can be omitted.

Bridge 104 has input terminals 135 and 136 and output terminals 137 and 138, and comprises fixed resistors 121 and 122 and variable resistors 123 and 29. A mechanical input 124 from a magnetic or gyro compass 125 is shown as varying the resistance of resistor 123. This unbalances bridge 104, impressing a signal voltage on an amplifier 126 connected to the output of the bridge. A motor 34 is accordingly energized to operate in a forward or reverse direction, depending on the direction of unbalance of the bridge, and a mechanical link 127 between motor 34 and resistor 29 enables operation of the motor to balance the bridge. The position of motor 34 hence will be dependent at all times upon the heading of the craft as determined by the compass 125.

In Figure 1 link 127 comprises shaft 33, worm 32, worm wheel 24, hub 28, and slider 26. It will be apparent that due to the positive drive between worm 32 and worm wheel 24, no movement of slider 26 can take place except under the actuation of motor 34, and that no actuation of knob 37 has any effect on the relation between arm 26 and winding 30.

While of course it is possible to continually adjust the angular relation of rack carrier 31 to shaft 56 by hand, in which case bridge 104 will not be required, it is much more convenient to provide the telemetric system controlled by the compass.

Bridge 101 is shown to comprise a plurality of fixed resistors 140, 141, and 142 and the variable resistor 78, and has input terminals 143 and 184 and output terminals 185 and 186. A meter 197 of any suitable type is connected to the output terminals of the bridge to indicate the amount of the unbalance. In Figure 1 resistor 78 is shown as being adjusted in accordance with the drift angle α of the craft; that is, with the angle between shaft 56 and member 72. The scale of meter 197 can accordingly be graduated directly in units of drift angle if desired. Drift angles larger than 30° in either direction can not ordinarily be anticipated, and a meter graduated 60° either side of dead ahead should be sufficient for any situation encountered by modern commercial craft: a scale range of 120° is easily to be obtained with available meters.

Bridge 102 is shown to comprise a plurality of fixed resistors 150, 151, and 152 and variable resistor 77, and has input terminals 153 and 154 and output terminals 155 and 156. A meter 157 is connected to the output terminals of the bridge to indicate the amount of the unbalance. In Figure 1, resistor 77 is shown as being adjusted in accordance with the magnitude of link 12; that is, the vector sum of the air speed and wind velocity, or the ground speed of the craft. The scale of meter 157 can be graduated directly in units of speed if desired, and the compression of the high speed end of the scale, due to the load on the unbalanced bridge provided by the meter is not inconvenient, since the larger values of ground speed are less likely to occur, and it is less necessary to read them with extreme accuracy. Operation of this bridge is effective to give an indication of the magnitude of the ground speed when the magnitude and direction of the air speed are known. It will be appreciated that if it is desired amplifiers and telemetric systems may be included in bridges 101 and 102 just as they were in bridges 103 and 104 to give remote indication of ground speed and drift angle, and it will also be appreciated that if desired members 72 and 61 can be graduated in linear and angular units respectively for direct mechanical reading of drift angle and ground speed without intervention of electrical means.

The operation of our invention may be summed up as follows. The device is mounted in the craft with the axis of shaft 56 extending fore and aft, and with guide 31 so arranged that when pivot 55 is in line with shaft 56 and between the shaft and the center of gear 51, index 40 indicates zero on the scale 41. Suppose now that the craft is flying due north at an air speed of 200 miles an hour. In response to the true air-speed meter, motor 70 is energized to move pivot member 61 along shaft 56 to a position corresponding to this air speed, and pivot 55 is coaxial with shaft 42. Now if the wind is estimated as 50 miles an hour, and its direction as easterly, knob 37 is rotated until it indicates 90° or due east, which is the negative of the direction of the wind, and knob 46 is rotated until index 54 comes to rest at the graduation corresponding to 50 miles per hour. The triangle comprising links 11, 12, and 13 is accordingly set up to give an indication of the drift angle of the plane and its ground speed, the former being evidenced by indicator 197 and the latter by indicator 157 in accordance with the unbalance of the respective bridges due to movement of contact members 74 and 73, respectively.

If the heading of the craft now changes by operation of the rudder or due to some inadvertent cause, motor 34 is actuated to rotate worm wheel 24 and with it shaft 20, rack guide 31, and indicator 41. Rotation of rack guide 31 changes the length and direction of link 12 to correspond with the new heading of the craft and its new relation to the wind, and indicators 197 and 157 again show the ground speed and drift angle of the craft in its new direction of flight.

Numerous objects and advantages of my invention have been set forth in the foregoing description together with details of the structure and function of the invention, and the novel features thereof are pointed out in the appended claims. The disclosure, however, is illustrative only, and we may make changes in detail, especially in matter of shape, size and arrangement of parts, within the principle of the invention, to the full extent indicated by the broad general meaning of the terms in which the appended claims are expressed.

We claim as our invention:

1. In a computer, in combination: a first member extending from a fixed point in a fixed direction; a second member; means varying the displacement of the remote end of said first member from said point in accordance with the magnitude of a first vector quantity, means varying the displacement of the remote end of said second member from said point in accordance with the magnitude of a second vector quantity, and means varying the direction of said last named member relative to that of said first named member in accordance with the direction of said second vector quantity relative to that of said first vector quantity, so that the line joining said remote ends of said members is the resultant of said vector quantities; and a control member comprising a first portion operatively connected to the remote end of one of said members and a second portion connected to the remote end of the other of said members and moveable with respect to said first portion; the control effect of said control member being determined by the distance between said first and second portions thereof.

2. In a computer, in combination: a first member extending from a fixed point in a fixed direction; a second member; means varying the displacement of the remote end of said first member from said point in accordance with the magnitude of a first vector quantity, means varying the displacement of the remote end of said second member from said point in accordance with the magnitude of a second vector quantity, and means varying the direction of said last named member relative to that of said first named member in accordance with the direction of said second vector quantity relative to that of said first vector quantity, so that the line joining said remote ends of said members is the resultant of said vector quantities; a third member joining the remote ends of said members; a first control member comprising a first portion operatively connected to the remote end of one of said members and a second portion fixed with respect to the remote end of the other of said members and movable with respect to said first portion, the control effect of said first control member being determined by the distance between said first and second portions thereof; a second control member comprising a first portion located at said first named remote end and fixed with respect to angular movement relative to the direction of said first member and a second portion angularly moveable with respect to said first portion in accordance with the direction of said third member with respect to that of said first member; the control effect of said second control member being determined by the angular displacement between the first and second portions thereof; a fourth member located at the remote end of said first named member and arranged for linear adjustment with respect to said third member and for rotational adjustment with respect to said first member; and means mounting said second portions of said first and second control members upon said fourth member.

3. In a device of the class described, in combination, a pair of shafts, the axes of said shafts being mutually perpendicular, a first pivot member mounted for axial movement along one of said shafts, means for causing said axial movement, a second pivot member mounted for radial movement with respect to the other of said shafts and for rotative movement unitary therewith, means for causing said radial movement of said second pivot member, means for causing rotative movement of said last named shaft about its axis, a guide pivoted about said first pivot member, a rod pivoted about said second pivot member for slidingly engaging said guide, said axial movement, said radial movement, and said rotative movement causing angular movement between said guide and said first pivot member, said movements likewise causing sliding movement between said rod and said guide, electrical contacting members carried by said guide and electrically insulated therefrom, an electrical resistance member cooperating with one of said contacting members for relative movement therebetween on angular movement of said guide with respect to said first pivot member, an electrical resistance member cooperating with another of said contacting members for relative movement therebetween on sliding movement of said guide with respect to said rod, means connecting said contacting members and said resistance members in electrical circuits whereby said relative movements may vary the resistances of portions of said circuits, and means deriving indications from said changes of resistances.

4. In a device of the class described, in combination: a pair of shafts, the axes of said shafts being mutually perpendicular; a first pivot member mounted for axial movement along one of said shafts; means for causing said axial movement; a second pivot member mounted for radial movement with respect to the other of said shafts and for rotative movement unitary therewith; means for causing said radial movement of said second pivot member; means for causing rotative movement of said last named shaft about its axis; a guide pivoted about said first pivot member and a rod pivoted about said second pivot member for slidingly engaging said guide, said axial movement, said radial movement, and said rotative movement causing angular movement between said guide and said first pivot member and sliding movement between said rod and said guide; and control means carried in part by said guide and in part by said rod and said first pivot member for giving outputs responsive to said sliding movement and said angular movement.

5. In a device of the class described, in combination: a pair of shafts, the axes of said shafts being mutually perpendicular; a first pivot member mounted for axial movement along one of said shafts; means for causing said axial movement; a second pivot member mounted for radial movement with respect to the other of said shafts and for rotative movement unitary therewith; means for causing said radial movement of said second pivot member; means for causing rotative movement of said last named shaft about its axis; a guide pivoted about said first pivot member and a rod pivoted about said second pivot member for slidingly engaging said guide, said axial movement, said radial movement and said rotative movement causing sliding movement between said guide and said rod; and control means carried in part by said guide and in part by said first pivoted member for giving an output responsive to said sliding movement.

6. In a device of the class described, in combination, a pair of shafts, the axes of said shafts being mutually perpendicular, a first pivot member mounted for axial movement along one of said shafts, means for causing said axial movement, a second pivot member mounted for radial movement with respect to the other of said shafts and for rotative movement unitary therewith, means for causing said radial movement of said second pivot member, means for causing rotative movement of said last named shaft about its axis, a guide pivoted about said first pivot member, a rod pivoted about said second pivot member for slidingly engaging said guide, said axial movement, said radial movement, and said rotative movement causing angular movement between said guide and said first pivot member, an electrical contacting member carried by said guide and electrically insulated therefrom, an electrical resistance member cooperating with said contacting member for relative movement therebetween on angular movement of said guide with respect to said first pivot member, means connecting said contacting member and said resistance member in an electrical circuit whereby said relative movements may vary the resistance of a portion of said circuit, and means deriving indications from said changes of resistance.

7. In a device of the class described, in combination, a pair of shafts, the axes of said shafts being mutually perpendicular, a first pivot member mounted for axial movement along one of said shafts, means for causing said axial movement, a second pivot member mounted for radial movement with respect to the other of said shafts and for rotative movement unitary therewith, means for causing said radial movement of said second pivot member, means for causing rotative movement of said last named shaft about its axis, a guide pivoted about said first pivot member, a rod pivoted about said second pivot member for slidingly engaging said guide, said axial movement, said radial movement, and said rotative movement causing sliding movement between said guide and said first pivot member, an electrical contacting member carried by said guide and electrically insulated therefrom, an electrical resistance member cooperating with said contacting member for relative movement therebetween on sliding movement of said guide with respect to said first pivot member, means connecting said contacting member and said resistance member in an electrical circuit whereby said relative movement may vary the resistance of a portion of said circuit, and means deriving indications from said changes of resistance.

8. In a wind triangle computer for use in avigation, in combination: means defining a position of zero displacement, means defining a zero direction from said first means; a first member of variable position defined by the magnitude of its displacement from said zero position along said direction; a second member of variable position defined by the magnitude of its displacement from said zero position and the magnitude of the angle between the zero direction and the direction of the line joining the position of said second member with said zero position, motor means for varying the displacement of said first member with variation in the air speed of a craft; means for relating the magnitude of the displacement of said second member with the magnitude of the wind encountered by said craft; manual means for relating said angle with the angle between the heading of the craft and the direction of said wind; means for maintaining said relation unchanged regardless of change in the heading of the craft; means linking said members, and means, including impedance means mounted on said linking means giving electrical response proportional to the effective length of said linking means, said response being related to the magnitude of the velocity of the craft with respect to the ground beneath it.

9. In a wind triangle computer for use in avigation, in combination: first and second members rotatable about a common axis; a third member movable in a fixed direction, coordinated with the heading of a craft, with respect to said axis; motor means varying the distance between said member and said axis in response to variations in the air speed of a craft; a wind velocity arm carrying a pivot at one of its ends; guiding and driving means carried by said first and second members for cooperation with said arm, whereby rotation of said first member varies the displacement of said pivot from said axis and rotation of said second member varies the angle between said fixed direction and the direction of said arm; manual means for rotating said first and second members through angles determined respectively by the magnitude and the azimuth of the velocity of wind encountered by said craft; motor means independently rotating said second member in response to change in the heading of said craft; means linking said pivot with said third member; first and second variable resistors; means varying the resistance of said first resistor with variation in the length of said link, and means varying the resistance of said second resistor with variation in the angle between said fixed direction and the direction of said link, whereby said resistances may be maintained in a given relation to the direction and magnitude of the ground speed of the craft.

10. An aircraft navigating instrument of the class described comprising, in combination, an axis, a first member displaceable from said axis in a fixed direction, a second member displaceable from said axis in any desired direction, a pair of electrical wipers carried by one of said members, a third member pivotally mounted upon said members and slidable in said one of said members, a linear resistance member carried by said third member for sliding contact with one of said wipers as said third member slides in said one member, and an arcuate resistance member mounted for sliding contact with the other of said wipers as said third member pivots about said one of said members.

11. An aircraft navigating instrument of the class described comprising, in combination, an axis, a first member displaceable from said axis in a fixed direction, a second member displaceable from said axis in any desired direction, an electrical wiper carried by one of said members, a third member pivotally mounted upon said members and slidable in said one of said members, and a linear resistance member carried by said third member for sliding contact with said wiper as said third member slides in said one of said members.

12. An aircraft navigating instrument of the class described comprising, in combination, an axis, a first member displaceable from said axis in a fixed direction, a second member displaceable from said axis in any desired direction, an electrical wiper carried by one of said members, a third member pivotally mounted upon said members, and an arcuate resistance member mounted for sliding contact with said wiper as said third member pivots about said one of said members.

13. In a computer, in combination: a first member extending from a fixed point in a fixed direction; a second member; means varying the displacement of the remote end of said first member from said point in accordance with the magnitude of a first vector quantity, means varying the displacement of the remote end of said second member from said point in accordance with the magnitude of a second vector quantity, and means varying the direction of said last named member relative to that of said first named member in accordance with the direction of said second vector quantity relative to that of said first vector quantity, so that the line joining said remote ends of said members is the resultant of said vector quantities; a control member comprising an elongated portion and a portion movable with respect thereto, the control effect of said control member being determined by the position of said movable portion on said elongated member; means aligning said elongated portion with the line joining said remote ends in a fixed relation to the remote end of one of said members; and means positioning said movable portion along said elongated portion in accordance with the position of the remote end of the other of said members.

JOHN M. ANDERSON.
FRANK M. EXNER.
RAYMOND E. HASELBERGER.

REFERENCES CITED

The following references are of record in the file of this patent:

UNITED STATES PATENTS

| Number | Name | Date |
| --- | --- | --- |
| 1,476,183 | Roucka | Dec. 4, 1923 |
| 1,743,239 | Ross | Jan. 14, 1930 |
| 1,784,929 | Estoppey | Dec. 16, 1930 |
| 1,910,093 | Colvin | May 23, 1933 |
| 1,968,539 | Rydberg | July 31, 1934 |
| 2,116,508 | Colvin | May 10, 1938 |
| 2,244,125 | Siefker | June 3, 1941 |

FOREIGN PATENTS

| Number | Country | Date |
| --- | --- | --- |
| 271,927 | Great Britain | May 30, 1927 |
| 392,827 | Germany | Mar. 25, 1924 |
| 463,251 | France | Dec. 12, 1913 |
| 571,074 | Germany | Feb. 23, 1933 |